United States Patent [19]
Shimizu

[11] Patent Number: 5,862,229
[45] Date of Patent: Jan. 19, 1999

[54] SOUND GENERATOR SYNCHRONIZED WITH IMAGE DISPLAY

[75] Inventor: Hideaki Shimizu, Kyoto, Japan

[73] Assignee: Nintendo Co., Ltd., Kyoto, Japan

[21] Appl. No.: 948,250

[22] Filed: Oct. 9, 1997

Related U.S. Application Data

[63] Continuation of Ser. No. 717,116, Sep. 20, 1996.

[30] Foreign Application Priority Data

Jun. 12, 1996 [JP] Japan .................................. 8-174307
Aug. 22, 1996 [JP] Japan .................................. 8-241312

[51] Int. Cl.$^6$ ...................................................... H04R 5/00
[52] U.S. Cl. .............................. 381/17; 381/18; 345/425; 463/35
[58] Field of Search ............................... 381/17–22, 104, 381/105, 107, 109, 119; 463/32–35; 352/12, 19; 345/425, 121

[56] References Cited

U.S. PATENT DOCUMENTS

| | | | |
|---|---|---|---|
| 4,281,833 | 8/1981 | Sandler | 463/35 |
| 4,792,974 | 12/1988 | Chace | 381/17 |
| 4,817,149 | 3/1989 | Myers | 381/1 |
| 5,046,097 | 9/1991 | Lowe et al. | 381/17 |
| 5,052,685 | 10/1991 | Lowe et al. | 381/17 |
| 5,095,507 | 3/1992 | Lowe | 381/17 |
| 5,095,798 | 3/1992 | Okada et al. | 381/17 |
| 5,105,462 | 4/1992 | Lowe et al. | 381/17 |
| 5,138,660 | 8/1992 | Lowe | 381/17 |
| 5,212,733 | 5/1993 | DeVitt et al. | 381/119 |
| 5,291,556 | 3/1994 | Gale | 381/17 |
| 5,317,714 | 5/1994 | Nakagawa et al. | 463/44 |
| 5,495,576 | 2/1996 | Ritchey | 345/425 |
| 5,524,060 | 6/1996 | Silfvast et al. | 381/119 |
| 5,636,283 | 6/1997 | Hill et al. | 381/63 |
| 5,715,318 | 2/1998 | Hill et al. | 381/17 |
| 5,754,660 | 5/1998 | Shimizu | 381/17 |
| 5,768,393 | 6/1998 | Mukojima et al. | 463/32 |
| 5,771,294 | 6/1998 | Inoue et al. | 381/17 |
| 5,798,922 | 8/1998 | Wood et al. | 381/17 |

FOREIGN PATENT DOCUMENTS

| | | |
|---|---|---|
| 60-9397 | 1/1985 | Japan . |
| 62-155879 | 7/1987 | Japan . |

*Primary Examiner*—Curtis A. Kuntz
*Assistant Examiner*—Xu Mei
*Attorney, Agent, or Firm*—Nixon & Vanderhye

[57] ABSTRACT

Digital sound data are stored in a data memory. When a first display object (such as an enemy character, a waterfall, or the like) is displayed in a three-dimensional manner on a display screen, an audio processor reads out corresponding sound source data from the data memory to produce first and second sound source data. The first and second sound source data are converted into analog audio signals by digital-to-analog converters, and then used to drive left and right speakers. The audio processor calculates a delay between generation of the first and second sound source data based on a direction of the first display object as viewed from a "virtual" camera which might correspond for example to one of the graphical characters in the three-dimensional display. The audio processor also controls sound volume levels for the first and second sound source data depending on the distance between the first display object and the virtual camera. Using the present invention, realistic sound effects consistent with and synchronized to visual changes of a three-dimensional image are generated by selectively controlling the timing and volume of sound source data provided to the left and right speakers.

37 Claims, 11 Drawing Sheets

SOUND GENERATOR SYNCHRONIZED WITH IMAGE DISPLAY

This is a continuation of application Ser. No. 08/717,116, filed Sep. 20, 1996, now pending.

FIELD OF THE INVENTION

The present invention relates generally to a sound generator synchronized with an image display, and more particularly, to a sound generator for generating sounds (such as a sound effect or music) having a three-dimensional quality or character on the basis of the direction, the distance, and other relationships between two displayed objects.

BACKGROUND OF THE INVENTION

A technique for generating stereo sounds is disclosed in Japanese Publication No. 9397/1985 (hereafter, JP9397). An audio signal is output as an analog signal immediately, and then after a delay, is output again to produce stereo sounds. However, JP9397 cannot be applied to a digital sound source. Nor does JP9397 take into account movement of an object or a character displayed on a screen of a CRT display. As a result, sounds associated with the object are not synchronized with the movement of the object.

Japanese Patent Laid-Open No. 155879/1987 (hereafter JP 155879) discloses a sound generator for generating two-dimensional sounds in relation to an image display. JP155879 controls the sound volumes of left and right speakers in a two-dimensional manner, such as for an airplane, by gradually decreasing the sound volume as the airplane moves away and gradually increasing the sound volume as the airplane moves closer.

However, the sound volume is only gradually decreased or increased as the airplane moves which may not give a desired realistic effect. Even when the sounds are heard in stereo, three-dimensional sound effects are not obtained making JP155879 unsuitable for a three-dimensional image display. The problem is further complicated since three-dimensional sound effects should be synchronized with three-dimensional image movement. In addition, as the difference between the sound volumes of the right and left sounds increases, the user is easily fatigued. It has been experimentally shown that the use of headphones with differing left and right ear volumes for an extended time often gives the listener a headache.

SUMMARY OF THE INVENTION

Therefore, an object of the present invention is to provide a sound generator capable of generating realistic three-dimensional sounds.

It is a further object to appropriately change three-dimensional sounds as a three-dimensional image changes.

Another object of the present invention is to provide a sound generator capable of reducing the headphone fatigue described above.

In an image display device for displaying a three-dimensional image, realistic sounds are generated to correspond with changing three-dimensional images. A sound source data storage digitally stores sound source data, and a temporary storage temporarily stores the sound source data read out from the sound source data storage. When a first display object which is associated with sounds is displayed, a delay time for generating those sounds is calculated on the basis of a direction to the first display object as viewed from the perspective of a predetermined viewpoint. That predetermined viewpoint perspective is referred to herein as a "virtual camera."

An audio processor reads out blocks or units of sound source data corresponding to the first display object from the sound source data storage, and stores that sound source data in the temporary storage while also reading out the sound source data as a first sound source data. After the delay time, the sound source data stored in the temporary storage as a second sound source data are read out. A first digital-to-analog converter converts the first sound source data into an analog audio signal which is fed to a first sound generator, e.g., a left or right speaker. A second digital-to-analog converter converts the second sound source data read out from the temporary storage section into an analog audio signal which is fed to a second sound generator, e.g., the other of the left or right speaker.

According to the present invention, when the first display object is displayed in the three-dimensional image, the delay time between the first sound source data and the second sound source data changes depending on the change in direction of the first display object relative to the predetermined viewpoint or virtual camera. Sounds having a spatial extent corresponding to the change of the three-dimensional image can be generated from the first and second sound source generators. Because the three-dimensional image display and sound effects coincide with each other, a user experiences more realistic three-dimensional image and sound effects. Further, when the user hears the sounds generated according to the present invention using a headphone stereo, listening fatigue of the user can be reduced.

The foregoing and other objects, features, aspects and advantages of the present invention will become more apparent from the following detailed description of the present invention when taken in conjunction with the accompanying drawings.

DETAILED DESCRIPTION

Figure 1:
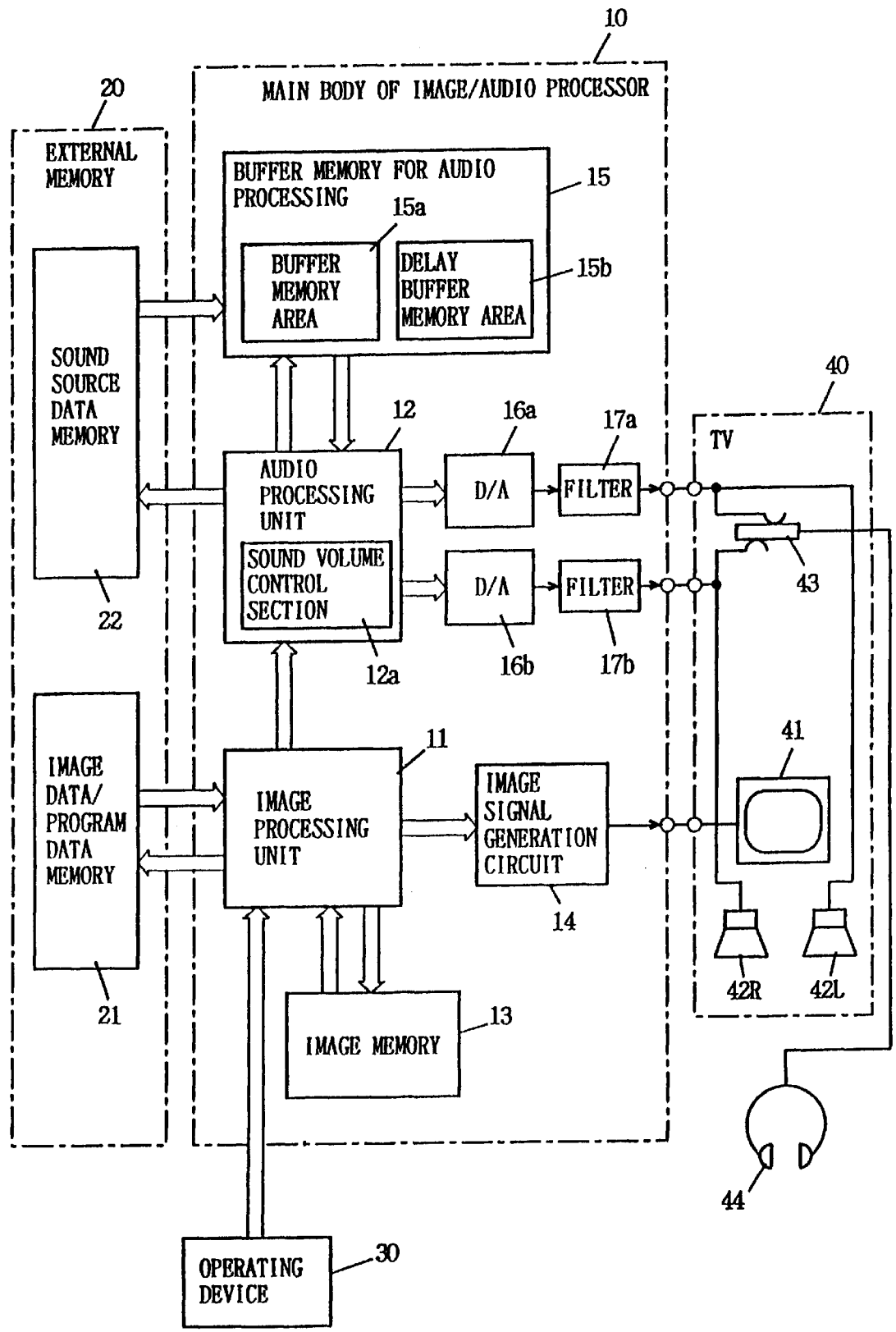
FIG. 1 is a block diagram showing the construction of a sound generator according to a first embodiment of the present invention.

FIG. 1 is a block diagram showing the construction of a sound generator according to a first example embodiment of the present invention. In FIG. 1, an image/audio processor 10 is, for example, a video game unit for generating images and sounds including music and sound effects for a game, and comprises an image processing unit 11 and an audio processing unit 12. An image memory 13 is connected to the image processing unit 11 through an address bus and a data bus. Further, an external memory 20 and an operating device/controller 30 are detachably connected to the image processing unit 11.

The image processing unit 11 performs image processing on the basis of data input from the controller 30 as well as image data and program data stored in an image data/program data memory 21 in the external memory 20. Image display data are provided to an image signal generation circuit 14. Specifically, the image processing unit 11 generates image display data for displaying one or a plurality of objects. Some of the objects have associated sounds such as music and/or a sound effect, e.g., a waterfall, a river, an animal, an automobile, an airplane, or the like, and some objects do not, e.g., a building, a plant, a road, a cloud, a scene, or the like.

Objects are displayed in a three-dimensional manner from a visual perspective, i.e., in the line of sight of a "virtual" camera. An image projected on the virtual camera is displayed on the screen of is the display device. Further, the visual viewpoint/line of sight of the virtual camera is moved by the progress of the game, the operation of a player, and the like. The images such as the first display object that the viewer sees on the display screen are in effect viewed through a virtual camera from a particular point of reference or perspective in the three-dimensional scene. When a hero character or other object (for example, a human being or an animal) moves, (e.g., movement of the hands and legs), the line of sight of the virtual camera may, in some cases, be moved in synchronization with the movement of the line of sight of the hero character.

The image signal generation circuit 14 generates an image signal with various synchronizing signals required to display an image by a CRT (Cathode Ray Tube) or a standard television receiver (hereinafter referred to as a "television") 40, which is one example of the display device, on the basis of the image display data fed from the image processing unit 11. The image generator 14 feeds the image signal to the television 40 to display an image on a display screen or a section of the display screen 41.

Furthermore, the image processing unit 11 feeds to the audio processing unit 12 coordinate data (hereinafter referred to as "first coordinate data") of an object which generates sounds (hereinafter referred to as a "sound generating object"), coordinate data (hereinafter referred to as "second coordinate data") of the virtual camera (or the hero character), and data for designating the type of sound for the purpose of changing a sound effect. Such sound effects might include the sound of a waterfall or a river, the sound of a moving automobile, or the cry of an animal as the line of sight of the virtual camera is moved. The sound type data is used to obtain three-dimensional sound effects in synchronization with three-dimensional image display. The coordinate data fed to the audio processing unit 12 also includes Z coordinate data representing a depth direction in addition to X coordinate data representing the transverse/horizontal direction of the display screen and Y coordinate data representing the longitudinal/vertical direction of the display screen.

A sound source data memory 22 included in the external memory 20 is detachably connected to the audio processing unit 12, and an audio processing buffer memory 15 (hereinafter referred to as a "buffer memory") for temporarily storing sound source data is connected thereto through a data bus and an address bus. The sound source data memory 22 stores a large amount of sound source data used for game programs stored in the external memory 20 in the form of PCM data or AD-PCM data.

Figure 9:
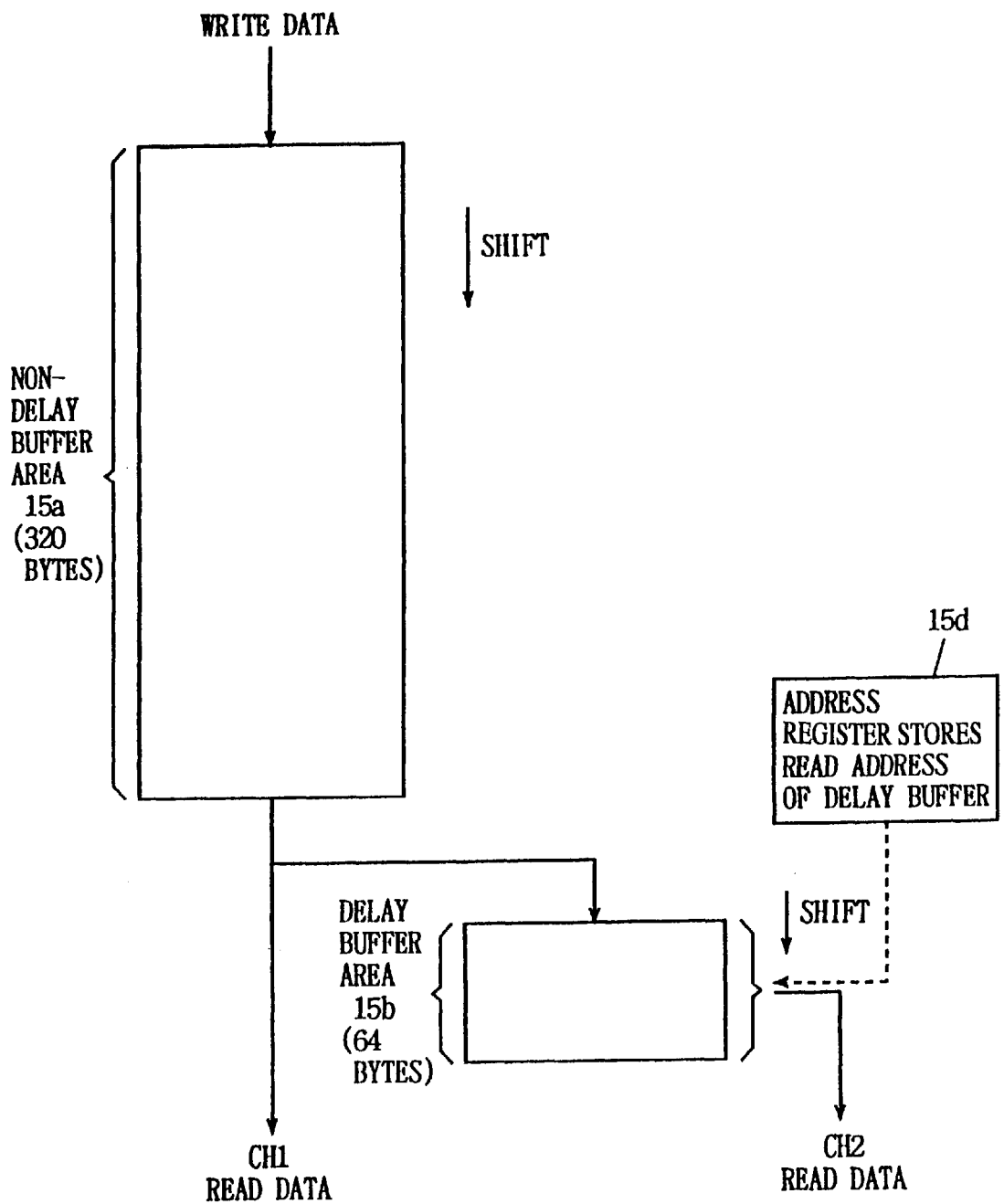
FIG. 9 is a diagram illustrating one example of a memory map of a sound memory area corresponding to a buffer memory shown in FIG. 1.

The buffer memory 15 includes a buffer area 15$a$ and a delay buffer area 15$b$, (see FIG. 9 showing the example embodiment as described in detail later). The buffer area 15$a$ temporarily stores audio data in order to generate a first audio signal which is not delayed over a given unit time, hereinafter referred to as "non-delay buffer area." The delay buffer area 15$b$ has a signal storage capacity corresponding to a maximum delay time necessary to generate a second audio signal delayed from the first audio signal by a time based on the distance and the direction between the coordinates of the sound generating object and the coordinates of the virtual camera or the hero character.

In the present example embodiment, if the maximum delay time is not less than one-fifth of the unit time, an unnatural impression is given when right and left sounds are heard. Therefore, the storage capacity of the delay buffer area 15$b$ is selected to be one-fifth of that of the non-delay buffer area 15$a$. For example, the non-delay buffer area 15$a$ has 320 bytes as a storage capacity corresponding to the unit time, and the delay buffer area 15$b$ has 64 bytes as a storage capacity corresponding to the maximum delay time. The unit processing time is determined by the relationship between a sampling frequency (e.g., 32 KHz) in a case where audio signals are sampled to produce audio data and a time corresponding to audio signals to be processed at one time, (that is, a time corresponding to the processing unit), and is set to $1/200$ to $1/240$ seconds in the present example embodiment. The delay time of the second audio signal from the first audio signal is variably controlled depending on (1) a direction of the sound generating object as viewed from the virtual camera (or the hero character) or (2) an amount of change in direction of the sound generating object as viewed from the virtual camera when the virtual camera (or the hero character) is moved, i.e., before and after the object movement (or angles based on the directions).

Figure 10:
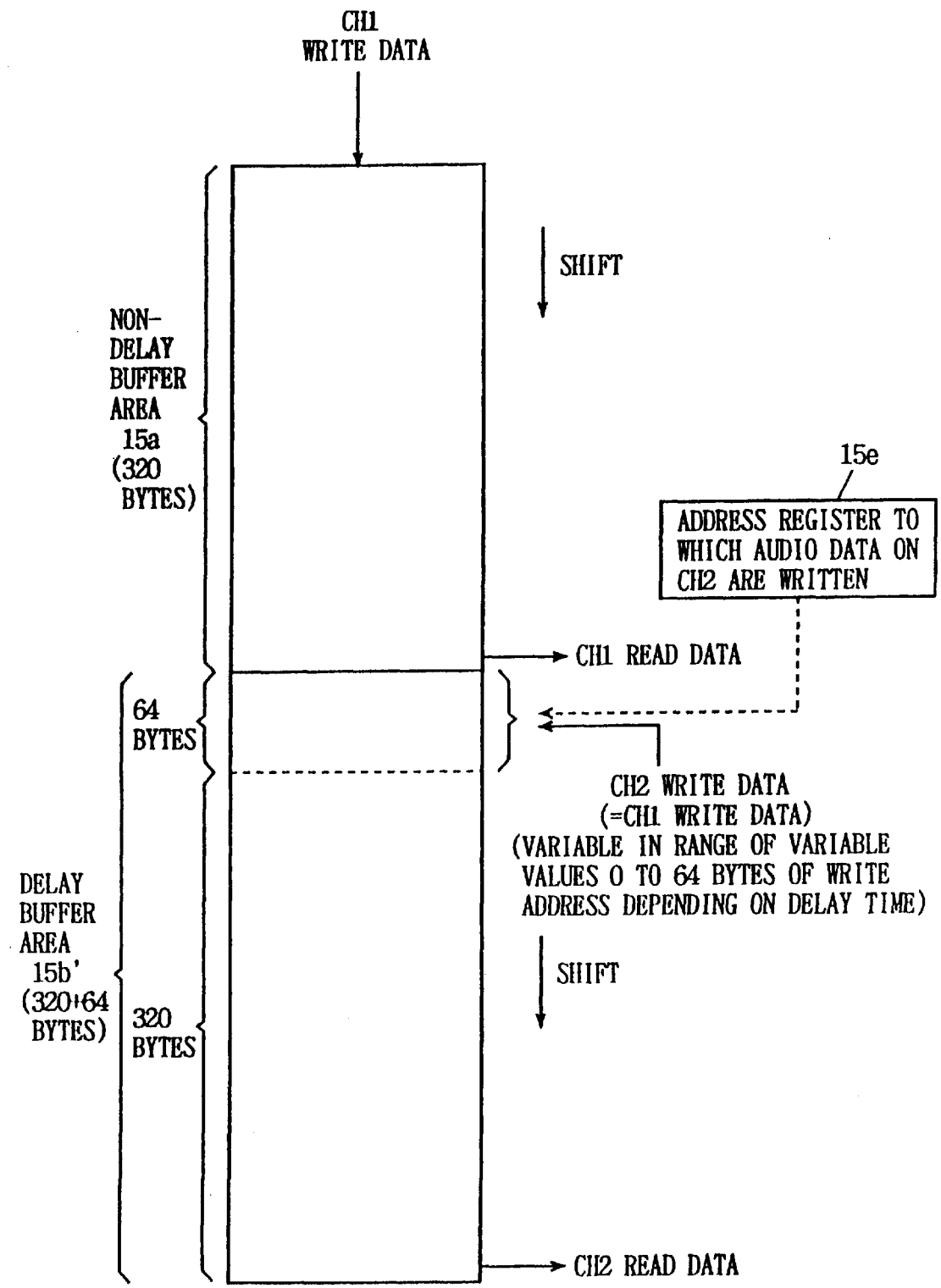
FIG. 10 is a diagram illustrating another example of a memory map of a sound memory area corresponding to a buffer memory shown in FIG. 1.

When the capacity of the buffer memory 15 is large, a starting address to which second sound source data are to be written may be variably controlled in the range of 0 to 64 bytes depending on the delay time using a delay buffer area 15b' having a storage capacity which is the sum of the storage capacity of the non-delay buffer area 15a and the storage capacity of the delay buffer area 15b in place of the delay buffer area 15b (see FIG. 10 showing the example embodiment as described in detail later).

The audio processing unit 12 (1) executes operation processing on the basis of predetermined programs in accordance with the first and second coordinate data, (2) finds a direction (or an angle) of the sound generating object as viewed from the virtual camera (or the hero character), and (3) determines on the basis of the direction, an amount of delay corresponding to the characteristic view shown in FIG. 6 as described later.

Furthermore, the audio processing unit 12 finds the distance between the sound generating object and the virtual camera or the hero character on the basis of the first and second coordinate data, and determines the sound volume on the basis of the distance. The audio processing unit 12 reads out audio data corresponding to the processing unit of audio data (320 bytes) out of the audio data stored in the sound source data memory 22 in a predetermined period and writes the audio data into the non-delay buffer area 15a. The audio processor 12 then determines the change (i.e., an angle) in direction of the sound generating object as viewed from the camera (or the hero character) on the basis of coordinate data respectively representing the position of the camera (or the hero character) and the positions of the sound generating object before and after the processing unit time. The audio processor 12 then determines the delay time corresponding to the determined amount of change. The delay time may be determined by previously storing data representing a delay time in a look-up table for each angle based on a direction and reading out corresponding data representing a delay time from the table. A write area of the delay buffer area 15b is determined depending on that delay time.

The audio processing unit 12 reads out the sound source data stored in the non-delay buffer area 15a and outputs the sound source data as first sound source data, writes the first sound source data into addresses of the delay buffer area 15b corresponding to the delay time, reads out the sound source data from the final address of the delay buffer area 15b, and then outputs the stored sound source data as second sound source data which is delayed from the first sound source data by the desired delay time.

The first audio signal and the second audio signal do not necessarily correspond to left and right speakers or left and right sound generating bodies of a headphone set. The first audio signal corresponds to a channel of audio signals which are not delayed, and the second audio signal corresponds to a channel of audio signals which are delayed. The audio processing unit 12 feeds the first audio data to a digital-to-analog conversion circuit for a left channel 16a and feeds the second audio data to a digital-to-analog conversion circuit for a right channel 16b when the sound generating object is on the left side of the camera (or the hero character). The audio processing unit 12 feeds the first audio data to the digital-to-analog conversion circuit for the right channel 16b and feeds the second audio data to the digital-to-analog conversion circuit for the left channel 16a when the sound generating object is on the right side as viewed from the virtual camera (or the hero character).

The digital-to-analog conversion circuits 16a and 16b subject the inputted audio data to digital-to-analog conversion, generate audio signals, and feed the audio signals to corresponding filters 17a and 17b. The filters 17a and 17b respectively subject the left and right audio signals to smooth the audio signals which are then fed to left and right speakers 42L and 42R in television 40 and/or to a headphone 44 through an earphone jack 42.

The audio processing unit 12 further includes a sound volume control section 12a. The sound volume control section 12a finds the distance between the sound generating object and the camera (or the hero character), and controls the sound volume depending on that distance. For example, the sound volume control section 12 increases the sound volume if the camera (or the hero character) approaches the sound generating object decreasing the distance therebetween, and decreases the volume if the camera (or the hero character) moves away from the sound generating object to increase the distance therebetween. When the sound volume is controlled to be inversely proportional to the square of the distance between the virtual camera (or the hero character) and the sound generating object, it is possible to change a sound effect corresponding to the change in three-dimensional image display with the movement of the virtual camera (or the hero character).

The above-mentioned operations are repeatedly performed for each processing unit. Consequently, more sophisticated sound effects for a game or music (game music) are generated improving the atmosphere of the game in synchronization with display changes of an image. The audio processing unit 12 controls a difference between timing at which the first audio data is output and timing at which the second audio data is output, (i.e., an amount of delay between first and second audio data), on the basis of a direction to or an angle of the sound generating object as viewed from the virtual camera (or the hero character). Audio processor 12 controls the sound volume on the basis of the distance between the position of the virtual camera (or the hero character) and the position of the sound generating object. As a result, audio or sound heard from the left and right speakers 42L and 42R or the headphone 44 change in a three-dimensional manner in synchronization with the change in three-dimensional image display corresponding to the movement of the line of sight between the sound generating object and the virtual camera (or the hero character).

More preferably, the amount of delay of right and left sound signals is controlled to realistically represent three-dimensional sound effects to reduce the range of sound volume as well as the maximum volume. Further, when a sound insulating object (for example, a building such as a house or a wall, or a large moving object such as a ship or an airplane) exists between the virtual camera (or the hero character) and the sound generating object, because one or both of the virtual camera (or the hero character) and the sound insulating object is moving, realistic sound effects are obtained if the sound volume control section 12a synchronously decreases the sound volume.

In conjunction with the block diagram of FIG. 1, the relationship between the delay time and the change in the sound volume depending on the presence or absence of the delays of the first and second audio signals will be specifically described. Programs stored in the image data/program data memory 21 are executed by the image processing unit 11 and the audio processing unit 12. For that purpose, it is assumed that programs for carrying out control as shown in characteristic views of FIGS. 3 to 6 are stored in the memory 21. Further, the sound volume may be controlled according to one of several modes: (1) delay (zero delay) (see FIG. 3), (2) a specified amount of delay (see FIG. 4), (3) a delay based on the distance between sound generating objects (see FIG. 5), and (4) a delay controlled by the positional relationship (the direction) between the sound generating object and the virtual camera (or the hero character) (see FIG. 6).

Specific methods for realizing control of the sound volume and/or the amount of delay are illustrated in FIGS. 3 to 6. Various relationships between the distance/direction and the sound volume illustrated as signal waveforms are also shown in FIGS. 3 to 6. Such relationships for controlling distance/direction and/or the sound volume may be predetermined, e.g., stored in a look-up table, or embodied as one or more equations stored in real time. In the look-up table embodiment, sound volume values of the waveform are stored in a table for each left and right unit distance centered around the position of the virtual camera (or the hero character) and read out using the current distance as an address to the table.

Figure 2:
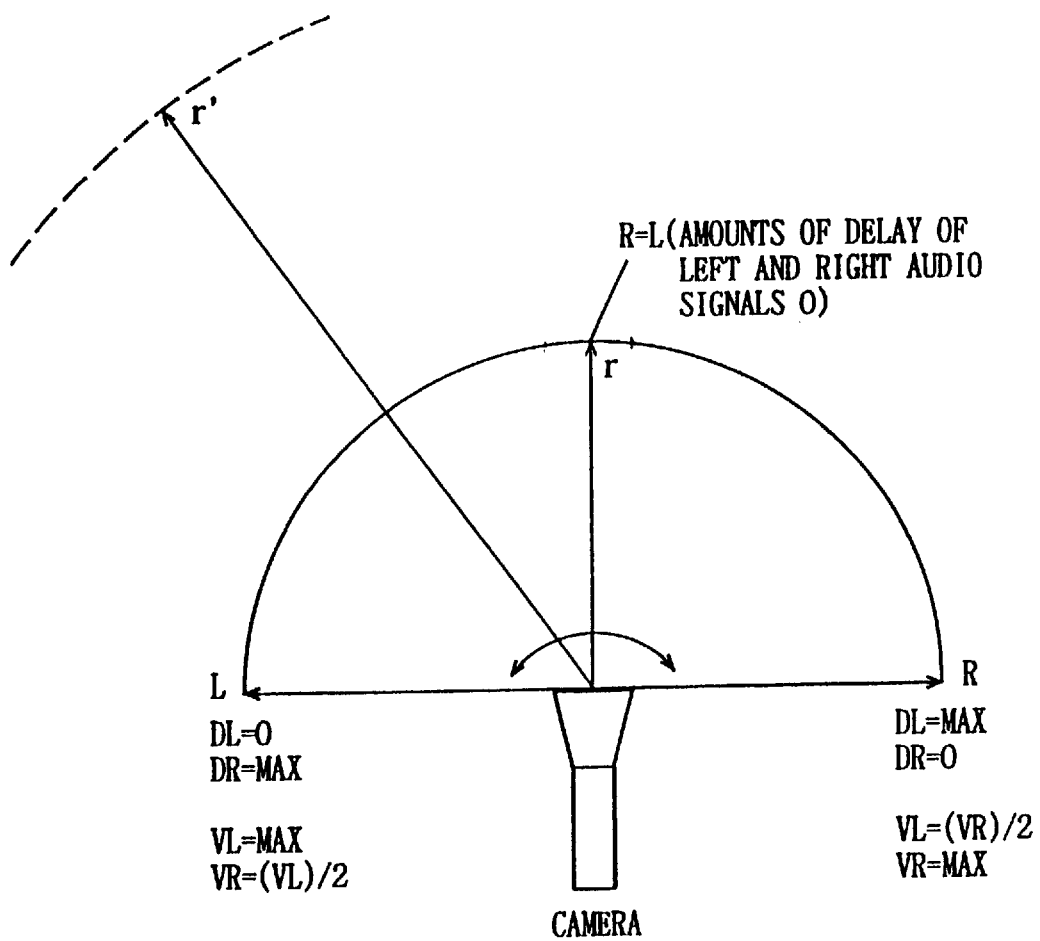
FIG. 2 is an illustration for explaining the principle in a case where the amounts of delay of left and right audio signals are varied on the basis of the positional relationship between a sound generating object and a camera.
Figure 3:
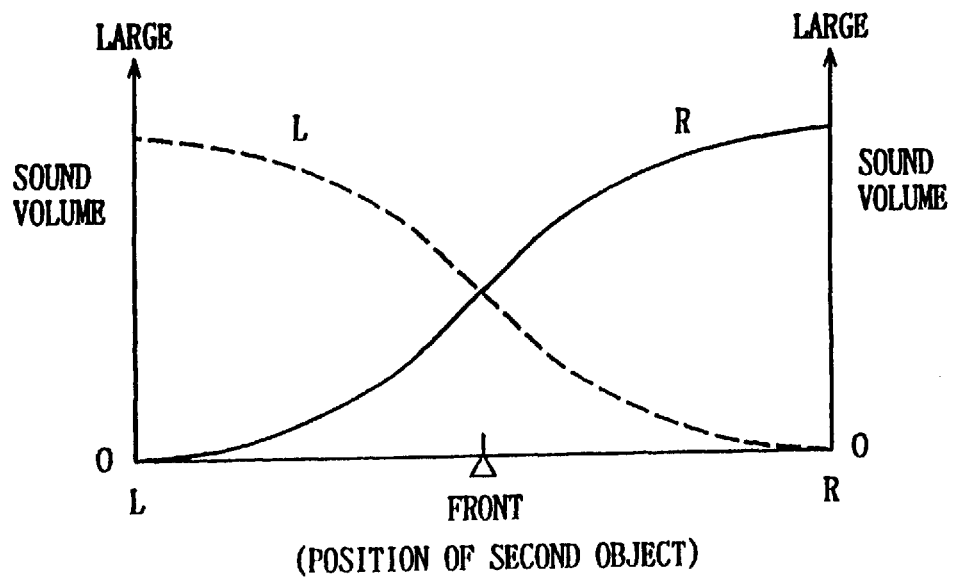
FIG. 3 is a characteristic view showing the relationship between the sound volume and the direction in a case where the sound volume is controlled under the condition that there is no amount of delay.

Referring now to FIGS. 2 and 3, description is made of the mode in which the sound volume is controlled without delay. For example, the distance between the sound generating object and the virtual camera (or the hero character) is constant in a game scene. In this instance or where it is otherwise preferable not to delay left and right audio signals, the sound volume of the left audio signal is set to a maximum amount and the sound volume of the right audio signal is set to zero when the sound generating object exists on the left side at an angle of 0° as viewed from the virtual camera (or the hero character) (see FIG. 3). As the sound generating object moves to the right drawing a semicircle of radius "r" around the virtual camera (or the hero character) as shown in FIG. 2, the sound volume of the right audio signal is gradually increased and the sound volume of We left audio signal is gradually decreased, as indicated by the characteristic view of FIG. 3. When the sound generating object reaches the front of the virtual camera (or the hero character) at position at an angle of 90° from the left side, the sound volumes of the left and right audio signals are made equal. Further, when the sound generating object moves right to reach a position on the right side of the virtual camera (or the hero character) at an angle of 180° from the left side, the sound volume of the left audio signal is set to zero, and the sound volume of the right audio signal is set to the maximum amount.

Even where the sound generating object is fixed and a direction of the virtual camera (or the hero character) changes, if the relative positional relationship between the sound generating object and the virtual camera (or the hero character) is the same as the relationship shown in FIGS. 2 and 3, the sound volumes of the left and right audio signals may be similarly controlled. The same applies to the cases shown in the characteristic views of FIGS. 4 to 6. It is preferable that the increase or decrease of the sound volumes is controlled in a multiplexed manner in accordance with the change in waveform characteristics L and R shown in FIG. 3. The sound volumes are inversely proportional to a value obtained by multiplying by a given coefficient the distance between the sound generating object and the camera (or the hero character).

Figure 4:
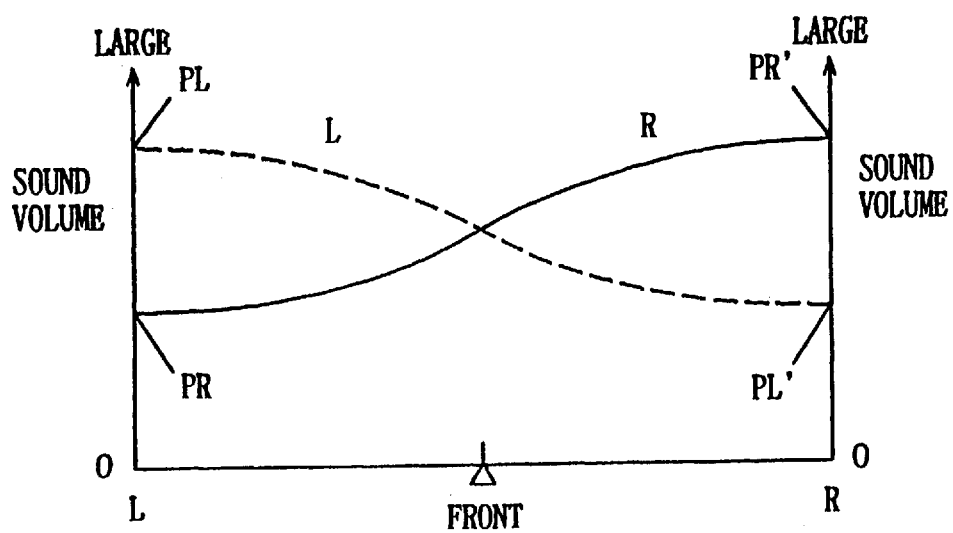
FIG. 4 is a characteristic view showing the relationship between the direction and the sound volume in a case where under the condition that there is an amount of delay, the amount of delay is variably controlled.

Referring now to FIGS. 2 and 4, description is now made of the mode in which the sound volume is controlled using some amount of delay. In a three-dimensional game scene where the sound volume is controlled, sound volume is controlled in relation to the amount of delay between the left and right audio signals. When the sound generating object is on the left side as viewed from the virtual camera (or the hero character), the sound volume of the left audio signal (L) is set to the maximum amount (PL) and the sound volume of the right audio signal (R) is set to approximately one-half of the maximum amount referred to as a minimum sound volume (PR) (see FIG. 4). The reason why the minimum sound volume is not set to zero but instead to one-half of the maximum sound volume is that three-dimensional sound effects are obtained by delaying the left and right audio signals even if the sound volumes of the left and right audio signals are not different. The sound volume of the right audio signal is gradually increased and the sound volume of the left audio signal is gradually decreased, as shown in FIG. 4, as the sound generating object is moved to the right so as to draw a semicircle spaced a predetermined distance r around the virtual camera (or the hero character) as shown in FIG. 2. When the sound generating object reaches the front of the camera (or the hero character), the sound volumes of the left and right audio signals are made equal. Further, when the sound generating object reaches the right side of the camera (or the hero character), the sound volume of the right audio signal is set to the maximum amount, and the sound volume of the left audio signal is set to one-half of the maximum amount.

Figure 5:
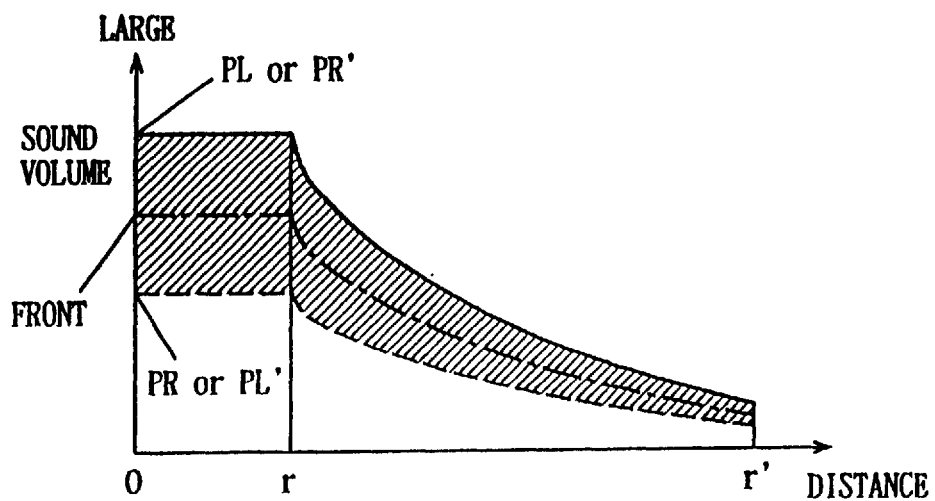
FIG. 5 is a characteristic view showing the relationship between the distance and the sound volume in a case where the sound volume is controlled under the condition that there is an amount of delay.

Referring now to FIGS. 2 and 5, description is made of the relationship between the distance and the sound volume in the delay mode shown in FIG. 4. When the sound generating object exists within the range of a radius r from the camera (or the hero character), the sound volume changes in the range between the maximum and the minimum amount depending on the direction or the position of the sound generating object as viewed from the camera (or the hero character). The reason for this is that if the sound generating object is positioned within the range of a short distance r, the sound volume hardly changes with the change in the distance as shown in FIG. 5. In FIG. 2, when the sound generating object is in front of the camera (or the hero character), the sound volumes of the left and right audio signals take values intermediate between the maximum and minimum amount. On the other hand, as the sound generating object moves away in the radial direction, the sound volume exponentially decreases as shown in FIG. 5. When the sound generating object moves sufficiently far from the camera (or the hero character) at r' in FIG. 5, the sound volume is set to zero.

Figure 6:
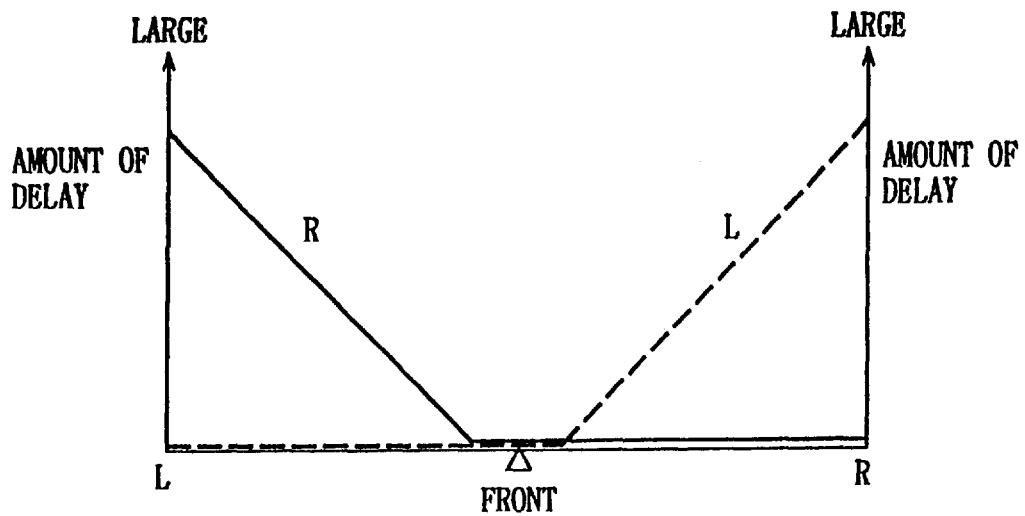
FIG. 6 is a characteristic view in a case where the amount of delay is controlled in relation to the positional relationship between a sound generating object and a camera (a hero character)

Referring now to FIGS. 2 and 6, description is made of the mode in which the amount of delay is controlled in relation to the positional relationship between the sound generating object and the virtual camera (or the hero character). When the virtual camera (or the hero character) faces forward and the sound generating object is in front of the camera, there is no delay between the left and right audio signals. If the amount of delay changes when the virtual camera (or the hero character) only slightly moves left or right, an unrealistic image display affect is produced. Therefore, the amount of delay is set to zero through a predetermined distance on the left and right side of the virtual camera (or the hero character). As shown in FIG. 6, when the sound generating object is on the left side as viewed from the camera (or the hero character), the delay of the left audio signal is set to zero and the amount of delay of the right audio signal is set to the maximum amount. The delay of the right audio signal decreases as the sound generating object moves right as to draw a semicircle spaced apart by a predetermined distance r around the virtual camera (or the hero character). The amount of delay of the left and right audio signals is set to zero in the range of predetermined distances on the left and right sides from the center. The amount of delay of the left audio signal gradually increases as the sound generating object moves right.

Figure 7:
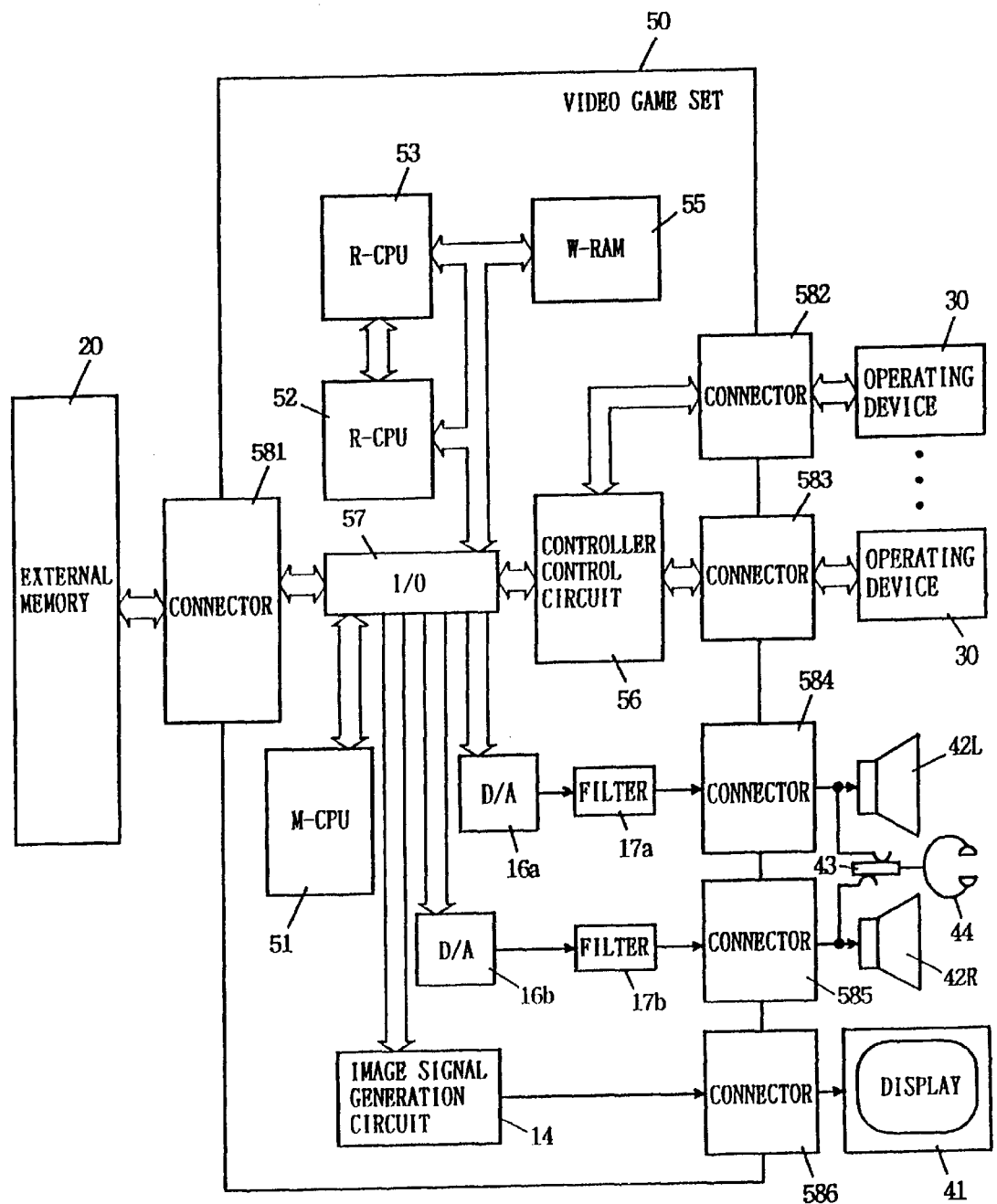
FIG. 7 is a block diagram showing the construction of a sound generator according to a second embodiment of the present invention.

FIG. 7 is a block diagram showing the construction of a sound generator according to a second embodiment of the present invention. The sound generator according to the present embodiment differs from the sound generator according to the first example embodiment (see FIG. 1) in the following points. First, the main body of the processor 10 is replaced with a video game set 50. Further, the image processing unit 11 is constituted by a main CPU (M-CPU) 51 and two RISC CPUs (R-CPUs) 52 and 53. The image memory 13 and the buffer memory 15 are constituted by a working RAM (W-RAM) 55 having a large storage capacity. Further, the audio processing unit 12 is constituted by one R-CPU 53, and R-CPU 53 may be used for both image processing and audio processing. The audio processing unit 12 is implemented as one R-CPU 53 because audio processing can be performed in a shorter time period than the image processing. The image memory 13 and the buffer memory 15 are one W-RAM 55 having a large capacity (for example, 4 megabytes) to increase the degree of freedom of memory space assignment so that the distribution of time periods used for the image processing and the audio processing can be set flexibly depending on the application.

In order to control input/output of a plurality of controllers 30, a controller control circuit 56 is provided. Further, an input/output control circuit (I/O) 57 controls data transfer or input/output between the M-CPU 51, the R-CPU 52, the R-CPU 53 and the W-RAM 55 and an external memory 20, the controller control circuit 56 and the like. Further, a connector for cartridge 581 is provided in order to detachably mount the external memory 20, connectors for a controller 582 and 583 are provided in order to detachably connect the controllers 30 to the controller control circuit 56, connectors for audio 584 and 585 are provided in order to connect filters 17a and 17b to speakers 52L and 42R or a headphone 44 of a television 40, and a connector for an image signal 586 is provided in order to connect an image signal generation circuit 14 to a display 41. In the following description, the various connectors 581 to 586 are merely referred to as "connectors." Since the other details are the same as that shown in FIG. 1, the same sections are assigned the same reference numerals, and the detailed description thereof is omitted.

As the external memory 20 serving as an information storage medium, the ROM cartridge may be replaced with various recording or storage media such as a CD-ROM optically storing data, a magnetic disk magnetically storing data, and a magneto-optic disk. In that case, a recording or reproducing device corresponding to the type of information storage medium must be provided to read out a certain amount of data from the information storage medium and temporarily store the data in a memory space in a part of the W-RAM 55 in the video game set 50.

Figure 8:
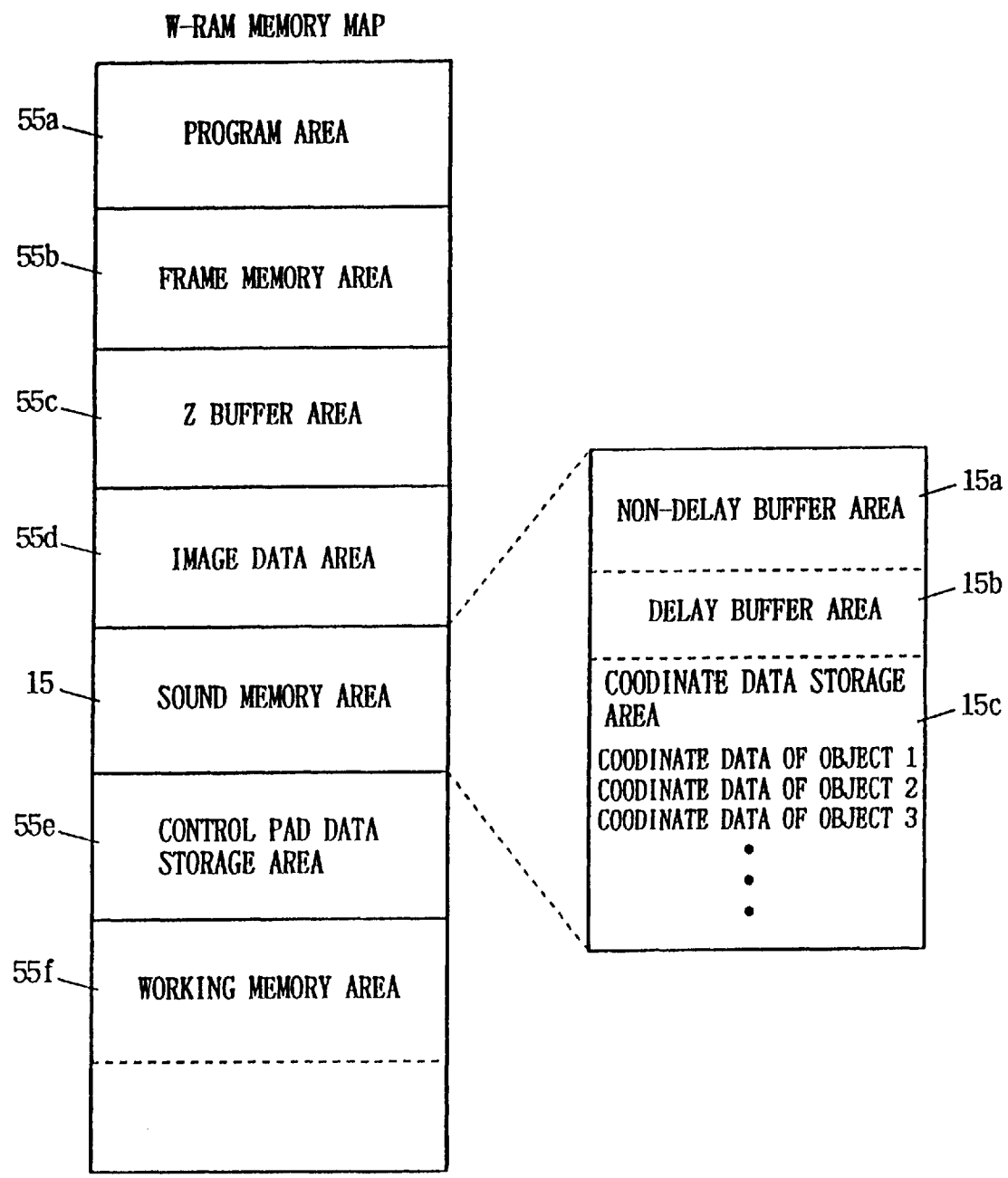
FIG. 8 is a diagram illustrating a memory space of a W-RAM shown in FIG. 7.

FIG. 8 is a diagram illustrating the memory space of the W-RAM 55. In the W-RAM 55, the memory space is assigned on the baiss of programs previously stored in an image/program memory 21 in the external memory 20. One example will be described as follows. The W-RAM 55 includes a program area 55a in which parts of the programs stored in the image/program memory 21 are transferred and stored, a frame memory area 55b storing image data corresponding to one frame (corresponding to an image frame), a Z-buffer area 55c storing depth coordinate data for each object or character, an image data area 55d, a sound memory area 15 for audio data processing, a control pad data storage area 55e, and a working memory area 55f.

The sound memory area 15 corresponds to the buffer memory shown in FIG. 1, and includes a non-delay buffer area 15a, a delay buffer area 15b, and an object coordinate data storage area 15c, as illustrated in FIG. 8. The non-delay buffer area 15a and the delay buffer area 15b have memory structures as specifically shown in FIG. 9, and data are written/read out as shown.

When audio data for each processing unit are written to/read out of the non-delay buffer area 15a, data previously written are shifted to the succeeding address one byte at a time every time an audio data byte is written to the first address. Specifically, audio data are written in a first-in first-out manner, and are read out as audio data on a first channel (CH1) from the final address. The first channel audio data read out from the non-delay buffer area 15a are written to the first address of the delay buffer area 15b. At this time, audio data at an address designated by an address register (an internal register included in the R-CPU 53) 15d storing a read address of the delay buffer area 15b are read out and output as audio data on a second channel (CH2). The number of addresses (bytes) from the first address of the delay buffer area 15b to the read address designated by the address register 15d is the delay between sounds on the second channel and sounds on the first channel. The memory capacity is sufficient to accomodate the maximum delay time of the delay buffer area 15b. However, this may complicate the read control program in the R-CPU 53. When the sounds on the second channel are not delayed, the read address designated by the address register 15d is set to the same first address as a write address of the delay buffer area 15b.

A memory structure as shown in FIG. 10 may be used if sound memory area 15 has a large, available storage capacity. The storage capacity of a delay buffer area 15b' is set to the sum of the storage capacities of a non-delay buffer area 15a and a delay buffer area 15b (15b'=15a+15b). Audio data on the first channel (CH1) are written and read out in the same manner as that as described for FIG. 9, while audio data on the second channel (CH2) are written and read out in the following manner. Specifically, a write address corresponding to a delay time is written into an address register 15e contained in the R-CPU 53 by the R-CPU 53. The same audio data as those on the first channel are simultaneously written at addresses designated by the address register 15e. The audio data are read out from the delay buffer area 15b', (i.e., sounds on the second channel are generated), starting at the final address of the delay buffer area 15b'. Consequently, the timing at which the audio data on the second channel are read out is delayed from the timing at which the same audio data on the first channel are read out (i.e., sounds on the first channel are generated) by a time period proportional to the number of addresses obtained by subtracting the value of the address in the address register 15e from the number of addresses corresponding to the delay buffer area 15b.

On the other hand, the coordinate data storage area 15c stores coordinate data of a sound generating object or the like displayed on a screen. For example, the coordinate data storage area 15c sorts coordinate data of an object 1 generating sounds such as an enemy character or a waterfall as coordinate data of the object 1. The coordinate data storage area 15c stores coordinate data of an object 2 such as a virtual camera (or the hero character) whose line of sight moves to see the object 1 by an operator operating the controllers 30 as coordinate data of the object 2. When sounds are generated from the object 1, the M-CPU 51 calculates a direction to the object 1 as viewed from the object 2 and the distance therebetween on the basis of the coordinate data of the object 1 and the coordinate data of the object 2. Further, a program for producing three-dimensional sound effects from the characteristic views of FIGS. 3 to 6 is executed on the basis of the direction and the distance to generate the delay time, the sound volume and the type of sound. The R-CPU 53 receives the data representing the delay time, the sound volume, and the type of sound, and carries out writing/reading to control the delay time and volume of the sounds generated from each of the first and second channels.

Figure 11:
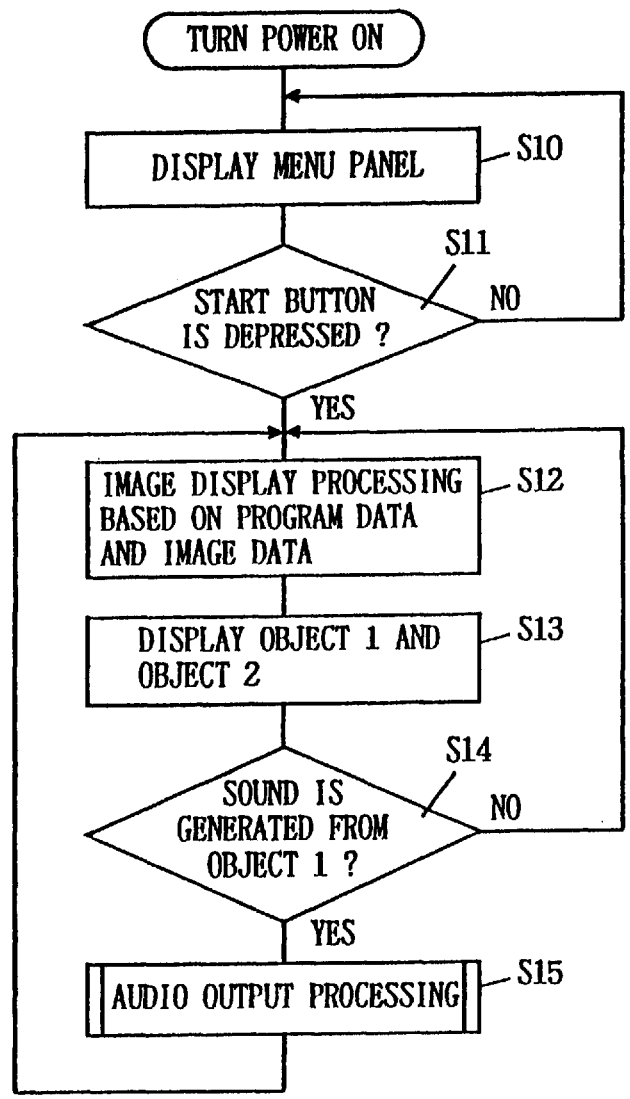
FIG. 11 is a flow chart showing schematic operations of a game.

Referring to FIG. 11, description is now made of the schematic flow of the game. When a power switch of the game set 50 is turned on, the following operations are performed by the M-CPU 51 and/or the R-CPUs 52 and 53. In the step S10, a menu panel for initialization of the game is displayed. In the step S11, the M-CPU 51 judges whether a decision button (for example, a start button) of the controller 30 is depressed. When it is judged that the start button is depressed, the program proceeds to the step S12. If the start button is not depressed, the program returns to the step S10. In the step S12, the M-CPU 51, the R-CPU 52 and the R-CPU 53 perform image display processing for the progress of the game on the basis of program data and image data which are stored in the external memory 20.

In step S13, an object 1 (which is for example an enemy character) generating sounds and an object 2 which is a hero character operated by an operator are displayed on the display 41 in a scene on a game screen. In step S14, it is judged whether object 1 should generate sounds. If so, the program proceeds to step S15 to process audio output (the processing is described in detail below referring to FIG. 12). If not, the program returns to step S12 to continue image display processing corresponding to the progress of the game.

Figure 12:
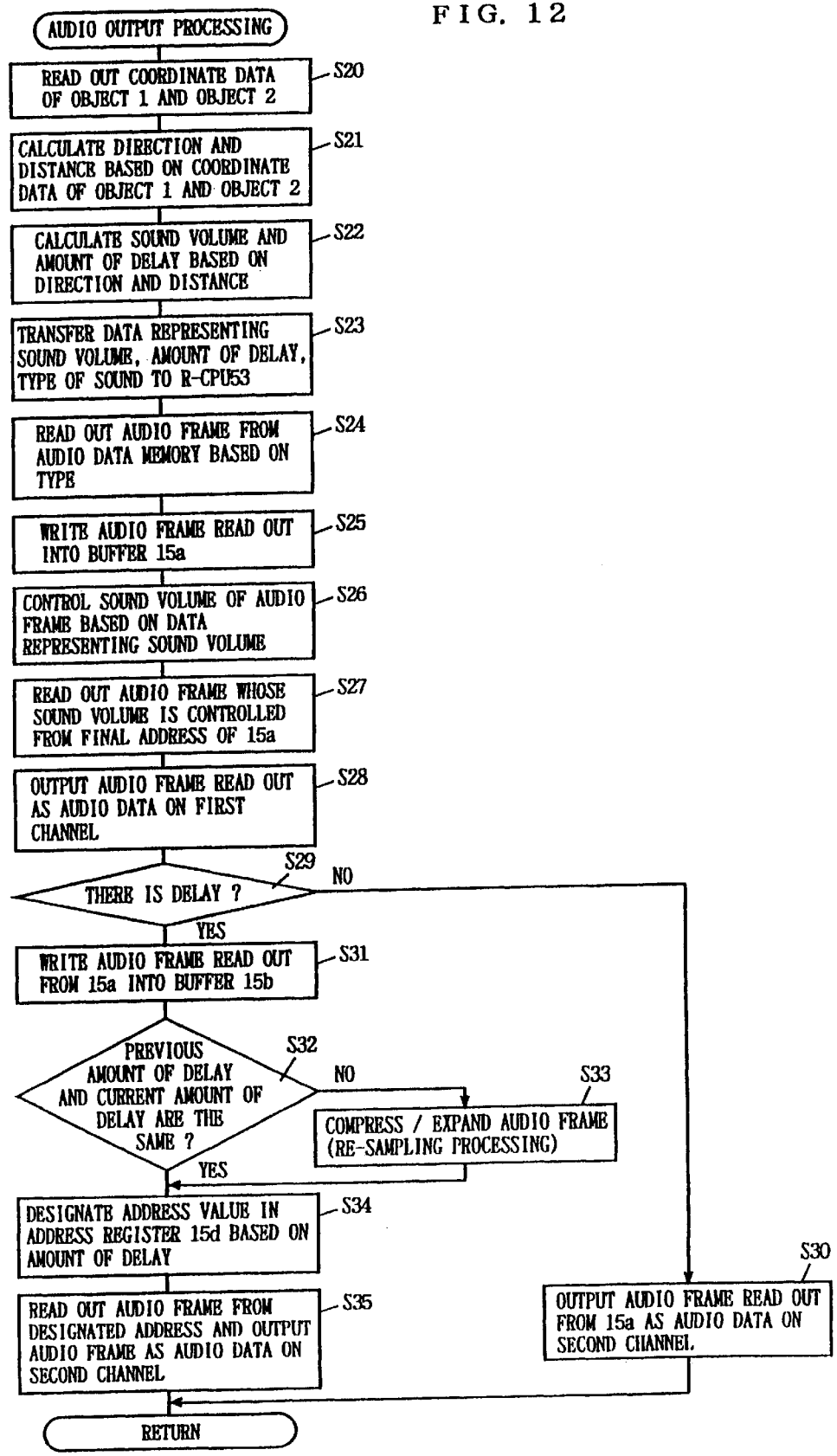
FIG. 12 is a flow chart showing the details of a subroutine of audio output processing shown in FIG. 11.

Referring now to FIG. 12, description is made of the audio output processing. First, in step S20, the M-CPU 51 reads out the coordinate data of the object 1 and the coordinate data of the object 2 on the basis of the coordinate data storage area 15c stored in the sound memory area 15 shown in FIG. 8. In step S21, the direction to the object 1 as viewed from the object 2 and the distance therebetween are then calculated on the basis of the coordinate data of the object 1 and the coordinate data of the object 2. In step S22, as described while referring to FIGS. 3 to 6, the amount of delay is calculated on the basis of the direction of the object 1, and the sound volume is calculated on the basis of the direction and the distance. In step S23, data representing the sound volume, the amount of delay, and the type of sound are transferred to the R-CPU 53. In step S24, the R-CPU 53 reads out an audio frame (audio data for each processing unit) from the sound source data memory 22 in the external memory 20 on the basis of the data representing the type of sound. In step S25, the audio frame read out from the sound source data memory 22 is written into the non-delay buffer area 15a shown in FIG. 9.

In step S26, the sound volume of the audio frame is controlled on the basis of the data representing the sound volume. Specifically, the sound volume is separately controlled on the left and right sides in correspondence to the direction of the object 1 as indicated by L and R in FIGS. 3 or 4 and the distance to the object 1 as shown in FIG. 5. In step S27, data of the audio frame whose sound volume is controlled is read out from the final address of the non-delay buffer area 15a. In step S28, the audio frame out is then outputted as audio data on a first channel. In step S29, the R-CPU 53 judges whether there is a delay. If there is no delay, the program proceeds to step S30, and the R-CPU 53 outputs the audio frame read out from non-delay buffer area 15a as audio data on a second channel.

On the other hand, when there is a delay, the program proceeds to step S31, and the R-CPU 53 writes the audio frame read out from the non-delay buffer area 15a into the delay buffer area 15b. In step S32, the R-CPU 53 judges whether the previous amount of delay is the same as the current amount of delay. When they are not the same, the program proceeds to step S33, and the R-CPU 53 re-samples the audio frame. Specifically, when the current amount of delay is smaller than the previous amount of delay, the R-CPU 53 compresses the audio frame by the amount of change in the amount of delay. When the current amount of delay is larger than the previous amount of delay, the R-CPU 53 expands the audio frame by the amount of change in the amount of delay. In the step S33, the re-sampling processing of the audio frame is then performed, after which the program proceeds to step S34.

When the current amount of delay is the same as the previous amount of delay, the program proceeds to step S34. Further, when the current amount of delay corresponds to the amount of delay at the time of starting sound generation, the current amount of delay cannot be compared with the previous amount of delay, whereby the program proceeds to step S34 considering that they are the same. In step S34, the R-CPU 53 designates a value of an address in the address register 15d on the basis of the amount of delay. In step S35, the R-CPU 53 then reads out the audio frame written into the delay buffer area 15b from the designated address, and outputs the audio frame as audio data on the second channel.

Figure 13:
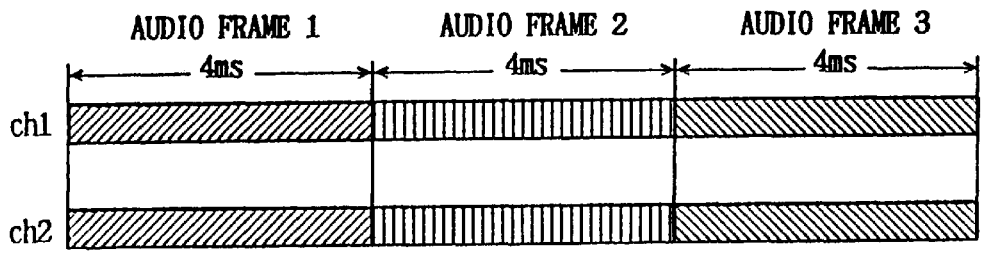
FIG. 13 is a timing chart showing output of audio data in a case where there is no amount of delay.
Figure 14:
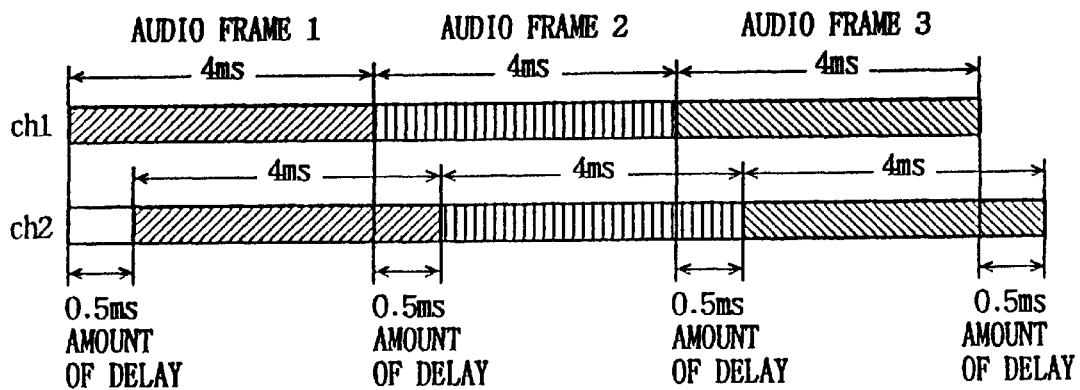
FIG. 14 is a timing chart showing output of audio data in a case where there is an amount of delay, and the previous amount of delay and the current amount of delay are the same.
Figure 15:
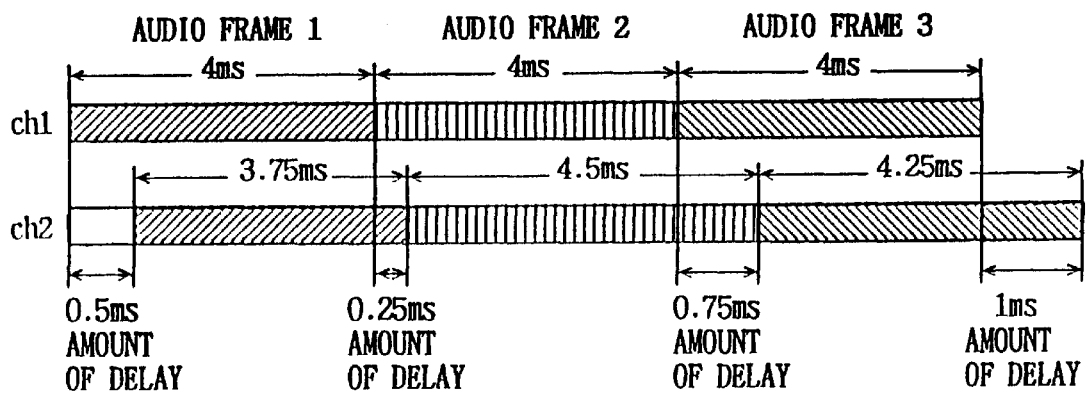
FIG. 15 is a timing chart showing output of audio data in a case where there is an amount of delay, and the previous amount of delay and the current amount of delay are not the same.

Referring now to a timing chart shown in FIGS. 13, 14 or 15, description is made of specific operations in the foregoing steps S29 to S35. In step S29, when there is no delay, audio data are output as shown in the timing chart of FIG. 13. In this example, the length of time of audio data for each processing unit (an audio frame) is set to $\frac{1}{240}$ seconds (approximately 4 ms), for example. When the audio frame 1 is output, delay processing is not performed by the first channel and the second channel. The R-CPU 53 simultaneously outputs the audio frame 1 to the first channel and the second channel. This is repeated with respect to data corresponding to the audio frame 2 and subsequent data.

When the previous and current delay are the same, (the amount of delay is constant), the audio data are output as shown in the timing chart of FIG. 14. In this example, it is assumed that a time period corresponding to the amount of delay is variably controlled in the range of 0 to $\frac{1}{1000}$ seconds (1 ms), and the second channel has a constant amount of delay of $\frac{1}{2000}$ seconds (0.5 ms). When sound generation starts, the R-CPU 53 outputs the audio frame 1 to the second channel after a delay of 0.5 ms from the audio frame 1 on the first channel. There is no sound on the second channel for a time period corresponding to the amount of delay. When the audio frame 1 on the first channel is output, a portion of audio which corresponds to 0.5 ms of the audio frame 1 remains on the second channel. When the audio frame 2 is output on the first channel, the portion corresponding to the remaining 0.5 ms of the audio frame 1 is output on the second channel, after the second frame 2 is output. This is repeated for audio frame 3 and subsequent data. Consequently, audio is output on the second channel after a delay of 0.5 ms from those on the first channel. This operation is repeated until the amount of delay changes or the sound is completed.

When the previous and the current amounts of delay are not the same, (the amount of delay is variable), audio data are output as shown in the timing chart of FIG. 15. For example, consider a case where when the audio frame 1 and the audio frame 2 on the side of the first channel are output, the audio frame 1 and the audio frame 2 on the second channel are respectively output after delays of 0.5 ms and 0.25 ms. The delay is decreased by 0.25 ms. Therefore, R-CPU 53 compresses the audio frame 1 on the second channel by 0.25 ms corresponding to the amount of change in the delay, and the audio frame 1 is re-sampled at 3.75 ms. When the audio frame 2 on the side of the first channel is outputted, a 0.25 ms portion of the audio frame 1 remains on the second channel.

When the audio frame 3 on the first channel is output, the delay on the second channel changes to 0.75 ms. The R-CPU 53 expands the audio frame 2 on the second channel by 0.5 ms corresponding to the change in delay. The audio frame 2 is re-sampled at 4.5 ms. When the audio frame 3 on the first channel is output, a portion corresponding to 0.75 ms of the audio frame 2 remains on the second channel to achieve the change in delay from 0.25 ms to 0.75 ms. Specifically, letting "n" be the length of time of the audio frame, "db" be the previous delay, and "df" be the next delay, the variable delay is achieved by re-sampling the audio frame at (n-df-db). Consequently, when the delay is variable, overlap noise and dropped data can be prevented by re-sampling the audio data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for generating realistic three-dimensional sound signals in a three-dimensional (3D) image displayed by an image display device, comprising the steps of:
    determining a display position of a first object displayed on the displayed 3D image;
    determining a display position of a second object displayed in the displayed 3D image, the second object being associated with a sound signal;
    selectively delaying when the sound signal is applied to one of the left and right speakers relative to when the sound is applied to the other of the left and right speakers based on relative movement in the displayed 3D image between the display position of the first object and the display position of the second object.

2. The method of claim 1, wherein there is no delay under a predetermined condition when the first and second objects are located within a range of display positions in the 3D image.

3. The method in claim 1, further comprising:
    determining a direction of the second display object relative to the first display object,
    wherein the amount of delay is based on the determined direction of the second display object relative to the first display object.

4. The method in claim 3, wherein as the second display object moves from left of the first display object to right of the first display object, the delay of the sound signal applied to the right speaker decreases to zero, and thereafter, the delay of the sound signal applied to the left speaker increases.

5. The method in claim 4, wherein the increase and decrease are linear, and wherein there is no delay for a range of positions of the second display object substantially directly in front of the first display object.

6. The method in claim 3, wherein a maximum delay is less than or equal to one-fifth of a unit time used to process one increment of sound signal.

7. The method in claim 3, wherein when the second display object is at 0° relative to the first display object, the delay of the sound signal provided to the right speaker is a maximum.

8. The method in claim 3, wherein when the second displayed object is at 90° relative to the first display object, there is no delay of the sound signal provided to either the left and right speakers.

9. The method in claim 3, wherein when the second display object is at 180° relative to the first display object, the delay of the sound signal provided to the left speaker is a maximum.

10. The method in claim 3, wherein the amount of delay is based on an angle defined by a line of sight between the first display object and the second display object.

11. The method in claim 10, wherein a lookup table is provided with a list of delays for various angles, the method further comprising:
    determining a current angle corresponding to the line of sight between the first display object and the second display object;
    accessing the lookup table with the determined angle;
    retrieving the delay corresponding to the determined angle; and
    applying the retrieved delay to the sound signal provided to one of the left and right speakers.

12. The method in claim 1, wherein the first display object is a character in the 3D image.

13. A method for generating realistic three-dimensional sound signals in a three-dimensional (3D) image displayed by an image display device, comprising the steps of:
    determining a display position of a first object displayed on the displayed 3D image;
    determining a display position of a second object displayed in the displayed 3D image, the second object being associated with a sound signal;
    determining a distance between the first display object and the second display object,
    controlling a volume of a sound signal associated with the second display object based on the determined distance.

14. The method in claim 13, wherein the sound signal is generated on a first channel applied to a left speaker and a second channel applied to a right speaker, and wherein different volumes are applied to sound signals provided to the left and right speakers in accordance with relative movement between the second display object and the first display object.

15. The method in claim 14, wherein when as the second display object moves from left of the first display object to right of the first display object, the volume of the sound signal applied to the left speaker decreases and the volume of the sound signal applied to the right speaker increases.

16. The method in claim 13, wherein for distances up to a first distance, volume changes based on a linear function, and wherein for distances greater than the first distance, volume changes based on an exponential function.

17. A method for generating realistic three-dimensional sound signals in a three-dimensional (3D) image displayed by an image display device, comprising the steps of:
    determining a display position of a first object displayed on the displayed 3D image;
    determining a display position of a second object displayed in the displayed 3D image the second object being associated with a sound signal;

determining a current distance between the first display object and the second display object;

determining a current relative direction between the first display object and the second display object;

changing how a sound signal associated with the second display object is generated based on the relative direction and the current distance between the first display object and the second display object.

18. The method in claim 17, wherein the sound signal is generated on a first channel applied to a left speaker and a second channel applied to a right speaker, and wherein different volumes are applied to sound signals provided to the left and right speakers in accordance with relative movement between the first and second display objects.

19. The method in claim 17, wherein the sound signal is generated on a first channel applied to a left speaker and on a second channel applied to a right speaker, the changing step further comprising:

selectively delaying when sound signal is generated in one of the left and right speakers relative to when the sound signal is generated in the other of the left and right speakers.

20. The method in claim 17, wherein when the object is at 0° relative to the first display object, the delay of the sound signal generated in the left speaker is zero, the delay of the sound signal generated in the right speaker is a maximum, the volume applied to the left speaker is a maximum, and the volume applied to the right speaker is a minimum value.

21. The method in claim 17, wherein when the object is at 90° relative to the first display object, the delay of the sound signal generated in the left speaker is equal to the delay of the sound signal generated in the right speaker and the volume of the sound signals applied to the left and right speakers is the same.

22. The method in claim 17, wherein when the object is at 180° relative to the point of reference, the delay of the sound signal generated in the left speaker is a maximum, the delay of the sound signal generated in the right speaker is zero, the volume applied to the left speaker is a minimum and the volume applied to the right speaker is a maximum.

23. The method in claim 17, wherein when as the second display object moves from left of the first display object to right of the first display object, the delay of the sound signal applied to the left speaker increases and the delay the sound signal applied to the right speaker decreases.

24. The method in claim 23, wherein as the second display object moves from left of the first display object to right of the first display object, the volume of the sound signal applied to the left speaker decreases and the volume of the sound signal applied to the right speaker increases.

25. The method in claim 24, wherein the applied volume varies from zero to a maximum volume.

26. The method in claim 25, wherein the increase and decrease occur gradually between zero and the maximum volume.

27. The method in claim 24, wherein the applied volume varies from one half of a maximum volume to the maximum volume.

28. The method in claim 27, wherein the increase and decrease occur gradually between one half the maximum volume and the maximum volume.

29. The method in claim 24, wherein when the second display object is in front of the first display object, the volume of the sound signals applied to the left and right speakers is the same.

30. An imaging system generating a sound signal synchronized with movement of a first moving object displayed in a three-dimensional (3D) image, comprising:

a display displaying the 3D image and the first object, the first object being viewed from a point of reference of a second object displayed in the displayed 3D image, and a data processor determining a position of the first display object in the displayed 3D image relative to the point of reference of the second display object and generating a sound signal associated with the first display object that changes based on relative movement between the point of reference of the second display object and the position of the first display object.

31. The system in claim 30, wherein the relative movement includes a distance between the second display object and the point of reference of the first display object, the data processor selectively modifying the volume of the sound signals applied to the left and right speakers based on the distance.

32. The system in claim 30, further comprising:

a left speaker and a right speaker to which the data processor applies the sound signal, and a memory for storing the sound signal, the data processor retrieving the sound signal from the memory and selectively applying the retrieved sound signal to the right and left speakers.

33. The system in claim 32, wherein the memory includes:

a first memory area storing the sound signal, and a second memory area storing the sound signal, wherein the data processor reads out the sound signal from the first memory for application to one of the left and right speakers and reads out the sound signal from the second memory for application to the other of the left and right speakers after a delay.

34. The system in claim 33, wherein the delay varies between zero to a maximum value depending on a current position of the second display object relative to the point of reference of the first display object, and wherein the data processor selectively delays when the sound signal is generated in one of the left and right speakers relative to when the sound signal is generated in the other of the left and right speakers.

35. The system in claim 33, wherein the first and second memory areas are first-in-first-out memories, and the second memory area has a fraction of the capacity of the first memory area.

36. The system in claim 33, wherein the first and second memory areas are first-in-first-out memories, and the second memory area has more capacity than the first memory area.

37. The system in claim 33, wherein the first and second memory areas are first-in-first-out memories, and an initial write location in the second memory area varies depending on the delay.

* * * * *